(12) United States Patent
Garg et al.

(10) Patent No.: US 11,550,716 B2
(45) Date of Patent: Jan. 10, 2023

(54) I/O AGENT

(71) Applicant: Apple Inc., Cupertino, CA (US)

(72) Inventors: Gaurav Garg, San Jose, CA (US); Sagi Lahav, Kiryat Bialik (IL); Lital Levy-Rubin, Tel Aviv (IL); Gerard Williams, III, Los Altos, CA (US); Samer Nassar, Haifa (IL); Per H. Hammarlund, Sunnyvale, CA (US); Harshavardhan Kaushikkar, San Jose, CA (US); Srinivasa Rangan Sridharan, Santa Clara, CA (US); Jeff Gonion, Campbell, CA (US); James Vash, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/648,071

(22) Filed: Jan. 14, 2022

(65) Prior Publication Data

US 2022/0318136 A1 Oct. 6, 2022

Related U.S. Application Data

(60) Provisional application No. 63/170,868, filed on Apr. 5, 2021.

(51) Int. Cl.
*G06F 12/00* (2006.01)
*G06F 12/06* (2006.01)
(Continued)

(52) U.S. Cl.
CPC ............ *G06F 12/063* (2013.01); *G06F 9/467* (2013.01); *G06F 12/0835* (2013.01); *G06F 12/0891* (2013.01); *G06F 13/1668* (2013.01)

(58) Field of Classification Search
CPC ........ G06F 12/00; G06F 13/00; G06F 12/063; G06F 12/0835; G06F 12/0891; G06F 13/1668; G06F 9/467
See application file for complete search history.

(56) References Cited

U.S. PATENT DOCUMENTS 6,049,847 A * 4/2000 Vogt ...................... G06F 12/082
711/149
6,263,409 B1 * 7/2001 Haupt .................. G06F 13/1626
710/39
(Continued)

FOREIGN PATENT DOCUMENTS

JP 2011-076159 A 4/2011

OTHER PUBLICATIONS

International Search Report and Written Opinion in PCT Appl. No. PCT/US2022/023296 dated Jul. 7, 2022, 12 pages.

*Primary Examiner* — Tuan V Thai
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to an I/O agent circuit of a computer system. The I/O agent circuit may receive, from a peripheral component, a set of transaction requests to perform a set of read transactions that are directed to one or more of a plurality of cache lines. The I/O agent circuit may issue, to a first memory controller circuit configured to manage access to a first one of the plurality of cache lines, a request for exclusive read ownership of the first cache line such that data of the first cache line is not cached outside of the memory and the I/O agent circuit in a valid state. The I/O agent circuit may receive exclusive read ownership of the first cache line, including receiving the data of the first cache
(Continued)

line. The I/O agent circuit may then perform the set of read transactions with respect to the data.

17 Claims, 7 Drawing Sheets

(51) Int. Cl.
    *G06F 12/0891*     (2016.01)
    *G06F 9/46*     (2006.01)
    *G06F 13/16*     (2006.01)
    *G06F 12/0831*     (2016.01)

(56) References Cited

U.S. PATENT DOCUMENTS

| | | |
|---|---|---|
| 9,170,946 B2 | 10/2015 | Hum et al. |
| 2003/0177316 A1 | 9/2003 | Rowlands et al. |
| 2007/0233932 A1 | 10/2007 | Collier et al. |
| 2009/0083488 A1* | 3/2009 | Madriles Gimeno ........................ G06F 12/0831 711/E12.001 |
| 2010/0169581 A1 | 7/2010 | Sheaffer et al. |
| 2014/0181394 A1 | 6/2014 | Hum et al. |
| 2019/0079877 A1* | 3/2019 | Gaur ................... G06F 12/0811 |

* cited by examiner

I/O AGENT

RELATED APPLICATIONS

The present application claims priority to U.S. Provisional Appl. No. 63/170,868, filed Apr. 5, 2021; the disclosure of which is hereby incorporated by reference herein in its entirety.

BACKGROUND

Technical Field

This disclosure relates generally to an integrated circuit and, more specifically, to cache coherency in relation to peripheral components.

Description of the Related Art

Modern computer systems often include various hardware components that are coupled to memory devices (e.g., random access memory) of those systems. The components typically retrieve data from those memory devices, manipulate the data, and then store that data back at one of those memory devices. In many cases, multiple components (e.g., cores of a processor) may wish to access the same data at relatively the same time. Consider an example in which a first processor core accesses a block of data that it temporarily stores locally. While the data is being held by the first processor core, a second processor core may attempt to access the block of data from the same data source so that it can be used by the second processor core. If data coherency is not maintained for that data, then issues can arise in which it becomes incoherent or is incorrectly processed. Similarly, data that is accessed by peripheral devices and processor cores, or other components that expect coherent access to memory, requires data coherency to be maintained.

SUMMARY

Various embodiments relating to an I/O agent circuit that is configured to implement coherency mechanisms for processing transactions associated with peripheral components (or, simply "peripherals") are disclosed. Generally speaking, a system on a chip (SOC) is coupled to memory that stores data, a set of one or more memory controllers that manage access to that memory, and peripherals that operate on data of that memory (e.g., read and write data). An I/O agent circuit is disclosed that is configured to bridge the peripherals to a coherent fabric that is coupled to the set of memory controllers, including implementing coherency mechanisms for processing transactions associated with those peripherals. Accordingly, the I/O agent circuit may receive, from a peripheral, requests to perform a set of read transactions that are directed to one or more cache lines of the SOC—the set is non-null and thus includes at least one read and/or write transaction. The I/O agent circuit may issue, to a memory controller circuit that manages access to one of those cache lines, a request for exclusive read ownership of that cache line such that the data of the cache line is not cached outside of the memory and the I/O agent circuit in a valid state. As a result, the I/O agent circuit may receive the data of the cache line and perform at least one of the read transactions against the cache line. The I/O agent circuit may also receive requests to perform write transactions and thus request exclusive write ownership of the appropriate cache lines. In some cases, the I/O agent circuit might lose exclusive ownership of a cache line before the I/O agent circuit has performed the corresponding transaction(s). If there exists a threshold number of remaining unprocessed transactions directed to the lost cache line, then the I/O agent circuit may reacquire exclusive ownership of the cache line.

DETAILED DESCRIPTION

Figure 1:
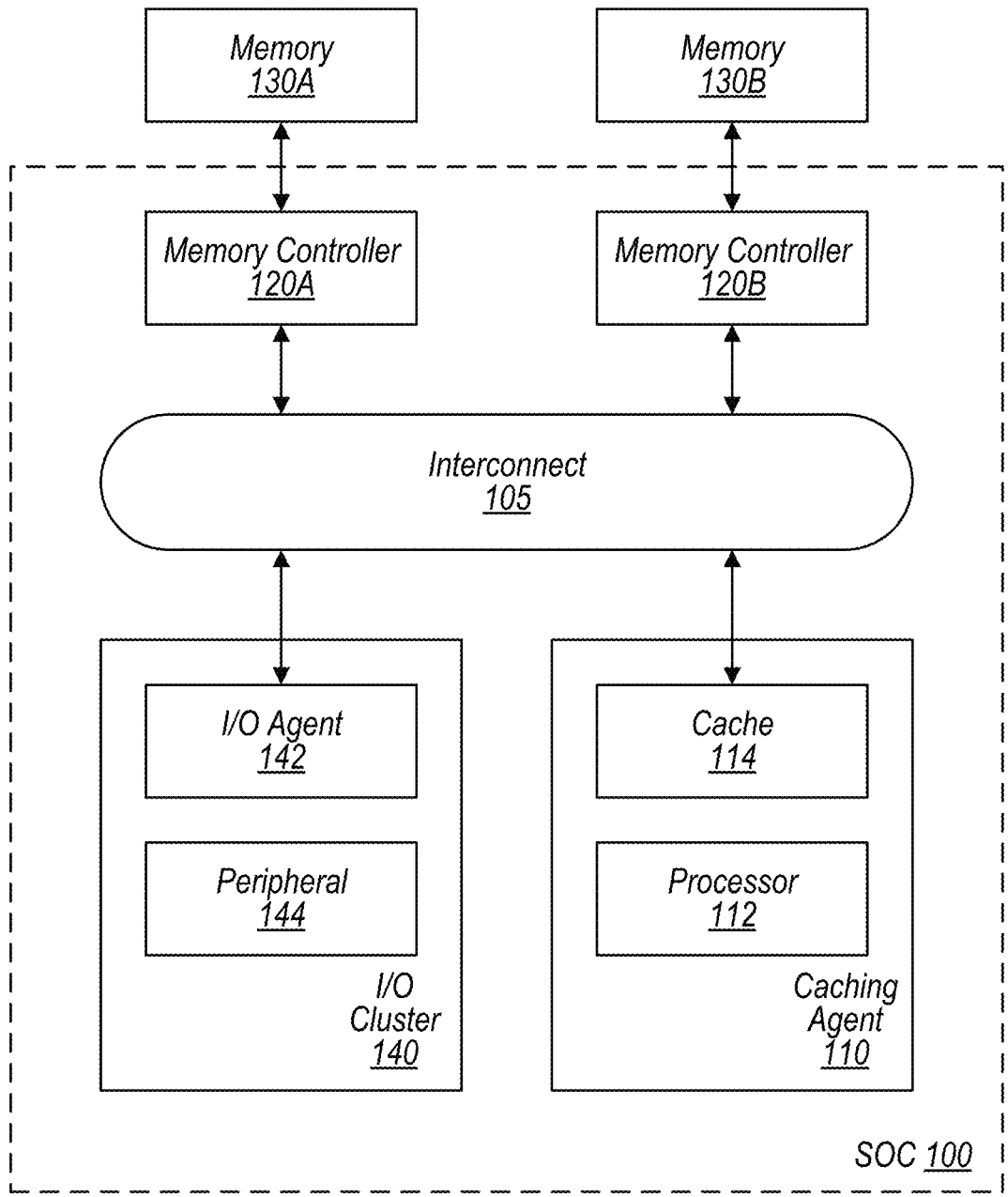
FIG. 1 is a block diagram illustrating example elements of a system on a chip, according to some embodiments.

In many instances, a computer system implements a data/cache coherency protocol in which a coherent view of data is ensured within the computer system. Consequently, changes to shared data are propagated throughout the computer system normally in a timely manner in order to ensure the coherent view. A computer system may implement a memory consistency model defines what can be expected by multiple software/hardware entities in terms of memory behavior to enable shared-memory communication—e.g., strong-ordering or relaxed-ordering. A computer system also typically includes or interfaces with peripherals, such as input/output (I/O) devices. These peripherals, however, are not configured to understand or make efficient use of the relaxed-memory consistency model that is implemented by the computer system. For example, peripherals often use specific order rules for their transactions (which are discussed further below) that are stricter than the consistency model. Many peripherals also do not have caches—that is, they are not cacheable devices. As a result, it can take reasonably longer for peripherals to receive completion acknowledgements for their transactions as they are not completed in a local cache. This disclosure addresses, among other things, these technical problems relating to peripherals not being able to make proper use of the relaxed-memory consistency model and not having caches.

The present disclosure describes various techniques for implementing an I/O agent that is configured to bridge peripherals to a coherent fabric and implement coherency mechanisms for processing transactions with non-relaxed ordering requirements associated with those I/O devices. In various embodiments that are described below, a system on a chip (SOC) includes memory, memory controllers, and an I/O agent coupled to peripherals. The I/O agent is configured to receive read and write transaction requests from the peripherals that target specified memory addresses whose data may be stored in cache lines of the SOC. (A cache line can also be referred to as a cache block.) In various embodiments, the specific ordering rules of the peripherals impose that the read/write transactions be completed serially (e.g., not out of order relative to the order in which they are received). As a result, in one embodiment, the I/O agent is configured to complete a read/write transaction before initiating the next occurring read/write transaction according to their execution order. But in order to perform those transactions in a more performant way, in various embodiments, the I/O agent is configured to obtain exclusive ownership of the cache lines being targeted such that the data of those cache lines is not cached in a valid state in other caching agents (e.g., a processor core) of the SOC. Instead of waiting for a first transaction to be completed before beginning to work on a second transaction, the I/O agent may preemptively obtain exclusive ownership of cache line(s) targeted by the second transaction. As a part of obtaining exclusive ownership, in various embodiments, the I/O agent receives data for those cache lines and stores the data within a local cache of the I/O agent. When the first transaction is completed, the I/O agent may thereafter complete the second transaction in its local cache without having to send out a request for the data of those cache lines and wait for the data to be returned. As discussed in greater detail below, the I/O agent may obtain exclusive read ownership or exclusive write ownership depending on the type of the associated transaction.

In some cases, the I/O agent might lose exclusive ownership of a cache line before the I/O agent has performed the corresponding transaction. For example, I/O agent may receive a snoop that causes the I/O agent to relinquish exclusive ownership of the cache line, including invalidating the data stored at the I/O agent for the cache line. A "snoop" or "snoop request," as used herein, refers to a message that is transmitted to a component to request a state change for a cache line (e.g., to invalidate data of the cache line stored within a cache of the component) and, if that component has an exclusive copy of the cache line or is otherwise responsible for the cache line, the message may also request that the cache line be provided by the component. In various embodiments, if there is a threshold number of remaining unprocessed transactions that are directed to the cache line, then the I/O agent may reacquire exclusive ownership of the cache line. For example, if there are three unprocessed write transactions that target the cache line, then the I/O agent may reacquire exclusive ownership of that cache line. This can prevent the unreasonably slow serialization of the remaining transactions that target a particular cache line. Larger or smaller numbers of unprocessed transactions may be used as the threshold in various embodiments.

These techniques may be advantageous over prior approaches as these techniques allow for the order rules of peripherals to be kept while partially or wholly negating negative effects of those order rules through implementing coherency mechanisms. Particularly, the paradigm of performing transactions in a particular order according to the order rules, where a transaction is completed before work on the next occurring transaction is started can be unreasonably slow. As an example, reading the data for a cache line into a cache can take over 500 clock cycles to occur. As such, if the next occurring transaction is not started until the previous transaction has completed, then each transaction will take at least 500 clock cycles to be completed, resulting in a high number of clock cycles being used to process a set of transactions. By preemptively obtaining exclusive ownership of the relevant cache lines as disclosed in the present disclosure, the high number of clock cycles for each transaction may be avoided. For example, when the I/O agent is processing a set of transactions, the I/O agent can preemptively begin caching the data before the first transaction is complete. As a result, the data for a second transaction may be cached and available when the first transaction is completed such that the I/O agent is then able to complete the second transaction shortly thereafter. As such, a portion of the transactions may not each take, e.g., over 500 clock cycles to be completed. An example application of these techniques will now be discussed, starting with reference to FIG. 1.

Turning now to FIG. 1, a block diagram of an example system on a chip (SOC) 100 is illustrated. As implied by the name, the components of SOC 100 are integrated onto a single semiconductor substrate as an integrated circuit "chip." But in some embodiments, the components are implemented on two or more discrete chips in a computing system. In the illustrated embodiment, SOC 100 includes a caching agent 110, memory controllers 120A and 120B coupled to memory 130A and 130B, respectively, and an input/output (I/O) cluster 140. Components 110, 120, and 140 are coupled together through an interconnect 105. Also as shown, caching agent 110 includes a processor 112 and a cache 114 while I/O cluster 140 includes an I/O agent 142 and a peripheral 144. In various embodiments, SOC 100 is implemented differently than shown. For example, SOC 100 may include a display controller, a power management circuit, etc. and memory 130A and 130B may be included on SOC 100. As another example, I/O cluster 140 may have multiple peripherals 144, one or more of which may be external to SOC 100. Accordingly, it is noted that the number of components of SOC 100 (and also the number of subcomponents) may vary between embodiments. There may be more or fewer of each component/subcomponent than the number shown in FIG. 1.

A caching agent 110, in various embodiments, is any circuitry that includes a cache for caching memory data or that may otherwise take control of cache lines and potentially update the data of those cache lines locally. Caching agents 110 may participate in a cache coherency protocol to ensure that updates to data made by one caching agent 110 are visible to the other caching agents 110 that subsequently read that data, and that updates made in a particular order by two or more caching agents 110 (as determined at an ordering point within SOC 100, such as memory controllers 120A-B) are observed in that order by caching agents 110. Caching agents 110 can include, for example, processing units (e.g., CPUs, GPUs, etc.), fixed function circuitry, and fixed function circuitry having processor assist via an embedded processor (or processors). Because I/O agent 142 includes a set of caches, I/O agent 142 can be considered a type of caching agent 110. But I/O agent 142 is different from other caching agents 110 for at least the reason that I/O agent 142 serves as a cache-capable entity configured to cache data for other, separate entities (e.g., peripherals, such as a display, a USB-connected device, etc.) that do not have their own caches. Additionally, the I/O agent 142 may cache a relatively small number of cache lines temporarily to improve peripheral memory access latency, but may proactively retire cache lines once transactions are complete.

In the illustrated embodiment, caching agent 110 is a processing unit having a processor 112 that may serve as the CPU of SOC 100. Processor 112, in various embodiments, includes any circuitry and/or microcode configured to execute instructions defined in an instruction set architecture implemented by that processor 112. Processor 112 may encompass one or more processor cores that are implemented on an integrated circuit with other components of SOC 100. Those individual processor cores of processor 112 may share a common last level cache (e.g., an L2 cache) while including their own respective caches (e.g., an L0 cache and/or an L1 cache) for storing data and program instructions. Processor 112 may execute the main control software of the system, such as an operating system. Generally, software executed by the CPU controls the other components of the system to realize the desired functionality of the system. Processor 112 may further execute other software, such as application programs, and therefore can be referred to as an application processor. Caching agent 110 may further include hardware that is configured to interface caching agent 110 to the other components of SOC 100 (e.g. an interface to interconnect 105).

Cache 114, in various embodiments, is a storage array that includes entries configured to store data or program instructions. As such, cache 114 may be a data cache or an instruction cache, or a shared instruction/data cache. Cache 114 may be an associative storage array (e.g., fully associative or set-associative, such as a 4-way set associative cache) or a direct-mapped storage array, and may have any storage capacity. In various embodiments, cache lines (or alternatively, "cache blocks") are the unit of allocation and deallocation within cache 114 and may be of any desired size (e.g. 32 bytes, 64 bytes, 128 bytes, etc.). During operation of caching agent 110, information may be pulled from the other components of the system into cache 114 and used by processor cores of processor 112. For example, as a processor core proceeds through an execution path, the processor core may cause program instructions to be fetched from memory 130A-B into cache 114 and then the processor core may fetch them from cache 114 and execute them. Also during the operation of caching agent 110, information can be written from cache 114 to memory (e.g., memory 130A-B) through memory controllers 120A-B.

A memory controller 120, in various embodiments, includes circuitry that is configured to receive, from the other components of SOC 100, memory requests (e.g., load/store requests, instruction fetch requests, etc.) to perform memory operations, such as accessing data from memory 130. Memory controllers 120 may be configured to access any type of memory 130. Memory 130 may be implemented using various, different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), etc. Memory available to SOC 100, however, is not limited to primary storage such as memory 130. Rather, SOC 100 may further include other forms of storage such as cache memory (e.g., L1 cache, L2 cache, etc.) in caching agent 110. In some embodiments, memory controllers 120 include queues for storing and ordering memory operations that are to be presented to memory 130. Memory controllers 120 may also include data buffers to store write data awaiting to be written to memory 130 and read data that is awaiting to be returned to the source of a memory operation, such as caching agent 110.

Figure 2:
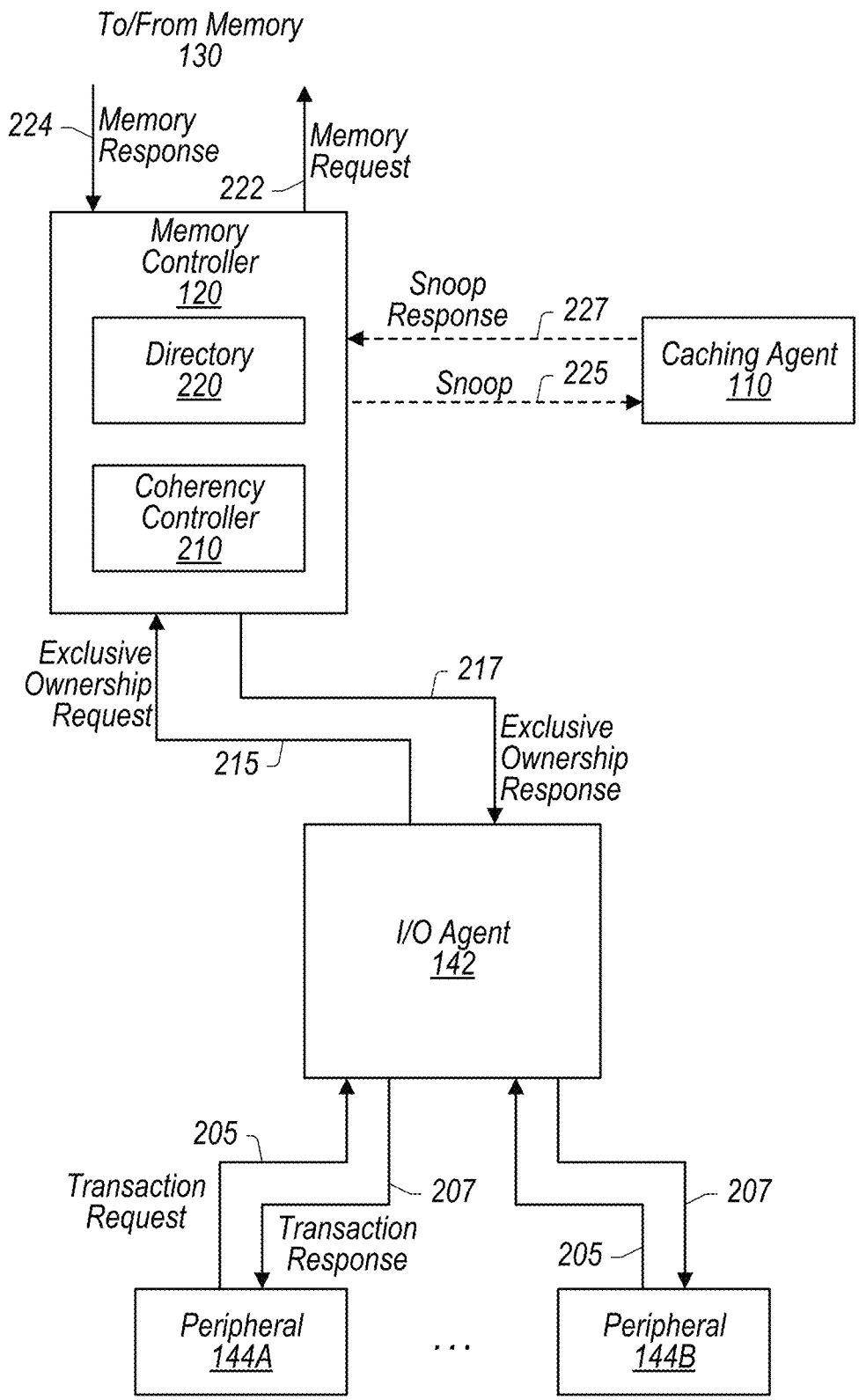
FIG. 2 is a block diagram illustrating example elements of interactions between an I/O agent and a memory controller, according to some embodiments.

As discussed in more detail with respect to FIG. 2, memory controllers 120 may include various components for maintaining cache coherency within SOC 100, including components that track the location of data of cache lines within SOC 100. As such, in various embodiments, requests for cache line data are routed through memory controllers 120, which may access the data from other caching agents 110 and/or memory 130A-B. In addition to accessing the data, memory controllers 120 may cause snoop requests to be issued to caching agents 110 and I/O agents 142 that store the data within their local cache. As a result, memory controllers 120 can cause those caching agents 110 and I/O agents 142 to invalidate and/or evict the data from their caches to ensure coherency within the system. Accordingly, in various embodiments, memory controllers 120 process exclusive cache line ownership requests in which memory controllers 120 grant a component exclusive ownership of a cache line while using snoop request to ensure that the data is not cached in other caching agents 110 and I/O agents 142.

I/O cluster 140, in various embodiments, includes one or more peripheral devices 144 (or simply, peripherals 144) that may provide additional hardware functionality and I/O agent 142. Peripherals 144 may include, for example, video peripherals (e.g., GPUs, blenders, video encoder/decoders, scalers, display controllers, etc.) and audio peripherals (e.g., microphones, speakers, interfaces to microphones and speakers, digital signal processors, audio processors, mixers, etc.). Peripherals 144 may include interface controllers for various interfaces external to SOC 100 (e.g., Universal Serial Bus (USB), peripheral component interconnect (PCI) and PCI Express (PCIe), serial and parallel ports, etc.) The interconnection to external components is illustrated by the dashed arrow in FIG. 1 that extends external to SOC 100. Peripherals 144 may also include networking peripherals such as media access controllers (MACs). While not shown, in various embodiments, SOC 100 includes multiple I/O clusters 140 having respective sets of peripherals 144. As an example, SOC 100 might include a first I/O cluster 140 having external display peripherals 144, a second I/O cluster 140 having USB peripherals 144, and a third I/O cluster 140 having video encoder peripherals 144. Each of those I/O clusters 140 may include its own I/O agent 142.

I/O agent 142, in various embodiments, includes circuitry that is configured to bridge its peripherals 144 to interconnect 105 and to implement coherency mechanisms for processing transactions associated with those peripherals 144. As discussed in more detail with respect to FIG. 2, I/O agent 142 may receive transaction requests from peripheral 144 to read and/or write data to cache lines associated with memory 130A-B. In response to those requests, in various embodiments, I/O agent 142 communicates with memory controllers 120 to obtain exclusive ownership over the targeted cache lines. Accordingly, memory controllers 120 may grant exclusive ownership to I/O agent 142, which may involve providing I/O agent 142 with cache line data and sending snoop requests to other caching agents 110 and I/O agents 142. After having obtained exclusive ownership of a cache line, I/O agent 142 may start completing transactions that target the cache line. In response to completing a transaction, I/O agent 142 may send an acknowledgement to the requesting peripheral 144 that the transaction has been completed. In some embodiments, I/O agent 142 does not obtain exclusive ownership for relaxed ordered requests, which do not have to be completed in a specified order.

Interconnect 105, in various embodiments, is any communication-based interconnect and/or protocol for communicating among components of SOC 100. For example, interconnect 105 may enable processor 112 within caching agent 110 to interact with peripheral 144 within I/O cluster 140. In various embodiments, interconnect 105 is bus-based, including shared bus configurations, cross bar configurations, and hierarchical buses with bridges. Interconnect 105 may be packet-based, and may be hierarchical with bridges, cross bar, point-to-point, or other interconnects.

Turning now to FIG. 2, a block diagram of example elements of interactions involving a caching agent 110, a memory controller 120, an I/O agent 142, and peripherals 144 is shown. In the illustrated embodiment, memory controller 120 includes a coherency controller 210 and directory 220. In some cases, the illustrated embodiment may be implemented differently than shown. For example, there may be multiple caching agents 110, multiple memory controllers 120, and/or multiple I/O agents 142.

As mentioned, memory controller 120 may maintain cache coherency within SOC 100, including tracking the location of cache lines in SOC 100. Accordingly, coherency controller 210, in various embodiments, is configured to implement the memory controller portion of the cache coherency protocol. The cache coherency protocol may specify messages, or commands, that may be transmitted between caching agents 110, I/O agents 142, and memory controllers 120 (or coherency controllers 210) in order to complete coherent transactions. Those messages may include transaction requests 205, snoops 225, and snoop responses 227 (or alternatively, "completions"). A transaction request 205, in various embodiments, is a message that initiates a transaction, and specifies the requested cache line/block (e.g. with an address of that cache line) and the state in which the requestor is to receive that cache line (or the minimum state as, in various cases, a more permissive state may be provided). A transaction request 205 may be a write transaction in which the requestor seeks to write data to a cache line or a read transaction in which the requestor seeks to read the data of a cache line. For example, a transaction request 205 may specify a non-relaxed ordered dynamic random-access memory (DRAM) request. Coherency controller 210, in some embodiments, is also configured to issue memory requests 222 to memory 130 to access data from memory 130 on behalf of components of SOC 100 and to receive memory responses 224 that may include requested data.

As depicted, I/O agent 142 receives transaction requests 205 from peripherals 144. I/O agent 142 might receive a series of write transaction requests 205, a series of read transaction requests 205, or combination of read and write transaction requests 205 from a given peripheral 144. For example, within a set interval of time, I/O agent 142 may receive four read transaction requests 205 from peripheral 144A and three write transaction requests 205 from peripheral 144B. In various embodiments, transaction requests 205 received from a peripheral 144 have to be completed in a certain order (e.g., completed in the order in which they are received from a peripheral 144). Instead of waiting until a transaction request 205 is completed before starting work on the next transaction request 205 in the order, in various embodiments, I/O agent 142 performs work on later requests 205 by preemptively obtaining exclusive ownership of the targeted cache lines. Accordingly, I/O agent 142 may issue exclusive ownership requests 215 to memory controllers 120 (particularly, coherency controllers 210). In some instances, a set of transaction requests 205 may target cache lines managed by different memory controllers 120 and as such, I/O agent 142 may issue exclusive ownership requests 215 to the appropriate memory controllers 120 based on those transaction requests 205. For a read transaction request 205, I/O agent 142 may obtain exclusive read ownership; for a write transaction request 205, I/O agent 142 may obtain exclusive write ownership.

Coherency controller 210, in various embodiments, is circuitry configured to receive requests (e.g., exclusive ownership requests 215) from interconnect 105 (e.g. via one or more queues included in memory controller 120) that are targeted at cache lines mapped to memory 130 to which memory controller 120 is coupled. Coherency controller 210 may process those requests and generate responses (e.g., exclusive ownership response 217) having the data of the requested cache lines while also maintaining cache coherency in SOC 100. To maintain cache coherency, coherency controller 210 may use directory 220. Directory 220, in various embodiments, is a storage array having a set of entries, each of which may track the coherency state of a respective cache line within the system. In some embodiments, an entry also tracks the location of the data of a cache line. For example, an entry of directory 220 may indicate that a particular cache line's data is cached in cache 114 of caching agent 110 in a valid state. (While exclusive ownership is discussed, in some cases, a cache line may be shared between multiple cache-capable entities (e.g., caching agent 110) for read purposes and thus shared ownership can be provided.) To provide exclusive ownership of a cache line, coherency controller 210 may ensure that the cache line is not stored outside of memory 130 and memory controller 120 in a valid state. Consequently, based on the directory entry associated with the cache line targeted by an exclusive ownership request 215, in various embodiments, coherency controller 210 determines which components (e.g., caching agents 110, I/O agents 142, etc.) are to receive snoops 225 and the type of snoop 225 (e.g. invalidate, change to owned, etc.). For example, memory controller 120 may determine that caching agent 110 stores the data of a cache line requested by I/O agent 142 and thus may issue a snoop 225 to caching agent 110 as shown in FIG. 2. In some embodiments, coherency controller 210 does not target specific components, but instead, broadcasts snoops 225 that are observed by many of the components of SOC 100.

In various embodiments, at least two types of snoops are supported: snoop forward and snoop back. The snoop forward messages may be used to cause a component (e.g., cache agent 110) to forward the data of a cache line to the requesting component, whereas the snoop back messages may be used to cause the component to return the data of the cache line to memory controller 120. Supporting snoop forward and snoop back flows may allow for both three-hop (snoop forward) and four-hop (snoop back) behaviors. For example, snoop forward may be used to minimize the number of messages when a cache line is provided to a component, since the component may store the cache line and potentially use the data therein. On the other hand, a non-cacheable component may not store the entire cache line, and thus the copy back to memory may ensure that the full cache line data is captured in memory controller 120. In various embodiments, caching agent 110 receives a snoop 225 from memory controller 120, processes that snoop 225 to update the cache line state (e.g., invalidate the cache line), and provides back a copy of the data of the cache line (if specified by the snoop 225) to the initial ownership requestor or memory controller 120. A snoop response 227 (or a "completion"), in various embodiments, is message that indicates that the state change has been made and provides the copy of the cache line data, if applicable. When the snoop forward mechanism is used, the data is provided to the requesting component in three hops over the interconnect 105: request from the requesting component to the memory controller 120, the snoop from the memory controller 120 to the caching, and the snoop response by the caching component to the requesting component. When the snoop back mechanism is used, four hops may occur: request and snoop, as in the three-hop protocol, snoop response by the caching component to the memory controller 120, and data from the memory controller 120 to the requesting component.

In some embodiments, coherency controller 210 may update directory 220 when a snoop 225 is generated and transmitted instead of when a snoop response 227 is received. Once the requested cache line has been reclaimed by memory controller 120, in various embodiments, coherency controller 210 grants exclusive read (or write) ownership to the ownership requestor (e.g., I/O agent 142) via an exclusive ownership response 217. The exclusive ownership response 217 may include the data of the requested cache line. In various embodiments, coherency controller 210 updates directory 220 to indicate that the cache line has been granted to the ownership requestor.

For example, I/O agent 142 may receive a series of read transaction requests 205 from peripheral 144A. For a given one of those requests, I/O agent 142 may send an exclusive read ownership request 215 to memory controller 120 for data associated with a specific cache line (or if the cache line is managed by another memory controller 120, then the exclusive read ownership request 215 is sent to that other memory controller 120). Coherency controller 210 may determine, based on an entry of directory 220, that cache agent 110 currently stores data associated with the specific cache line in a valid state. Accordingly, coherency controller 210 sends a snoop 225 to caching agent 110 that causes caching agent 110 to relinquish ownership of that cache line and send back a snoop response 227, which may include the cache line data. After receiving that snoop response 227, coherency controller 210 may generate and then send an exclusive ownership response 217 to I/O agent 142, providing I/O agent 142 with the cache line data and exclusive ownership of the cache line.

After receiving exclusive ownership of a cache line, in various embodiments, I/O agent 142 waits until the corresponding transaction can be completed (according to the ordering rules)—that is, waits until the corresponding transaction becomes the most senior transaction and there is ordering dependency resolution for the transaction. For example, I/O agents 142 may receive transaction requests 205 from a peripheral 144 to perform write transactions A-D. I/O agent 142 may obtain exclusive ownership of the cache line associated with transaction C; however, transactions A and B may not have been completed. Consequently, I/O agent 142 waits until transactions A and B have been completed before writing the relevant data for the cache line associated with transaction C. After completing a given transaction, in various embodiments, I/O agent 142 provides a transaction response 207 to the transaction requestor (e.g., peripheral 144A) indicating that the requested transaction has been performed. In various cases, I/O agent 142 may obtain exclusive read ownership of a cache line, perform a set of read transactions on the cache line, and thereafter release exclusive read ownership of the cache line without having performed a write to the cache line while the exclusive read ownership was held.

In some cases, I/O agent 142 might receive multiple transaction requests 205 (within a reasonably short period of time) that target the same cache line and, as a result, I/O agent 142 may perform bulk read and writes. As an example, two write transaction requests 205 received from peripheral 144A might target the lower and upper portions of a cache line, respectively. Accordingly, I/O agent 142 may acquire exclusive write ownership of the cache line and retain the data associated with the cache line until at least both of the write transactions have been completed. Thus, in various embodiments, I/O agent 142 may forward executive ownership between transactions that target the same cache line. That is, I/O agent 142 does not have to send an ownership request 215 for each individual transaction request 205. In some cases, I/O agent 142 may forward executive ownership from a read transaction to a write transaction (or vice versa), but in other cases, I/O agent 142 forwards executive ownership only between the same type of transactions (e.g., from a read transaction to another read transaction). In some embodiments, I/O agent 142 may issue an exclusive write ownership request 215 that requests exclusive ownership of a cache line without receiving data when it is performing a full cache write and the cache line is not in a modified state.

In some cases, I/O agent 142 might lose exclusive ownership of a cache line before I/O agent 142 has performed the relevant transactions against the cache line. As an example, while waiting for a transaction to become most senior so that it can be performed, I/O agent 142 may receive a snoop 225 from memory controller 120 as a result of another I/O agent 142 seeking to obtain exclusive ownership of the cache line. After relinquishing exclusive ownership of a cache line, in various embodiments, I/O agent 142 determines whether to reacquire ownership of the lost cache line. If the lost cache line is associated with one pending transaction, then I/O agent 142, in many cases, does not reacquire exclusive ownership of the cache line; however, in some cases, if the pending transaction is behind a set number of transactions (and thus is not about to become the senior transaction), then I/O agent 142 may issue an exclusive ownership request 215 for the cache line. But if there is a threshold number of pending transactions (e.g., two pending transactions) directed to the cache line, then I/O agent 142 reacquires exclusive ownership of the cache line, in various embodiments.

Figure 3A:
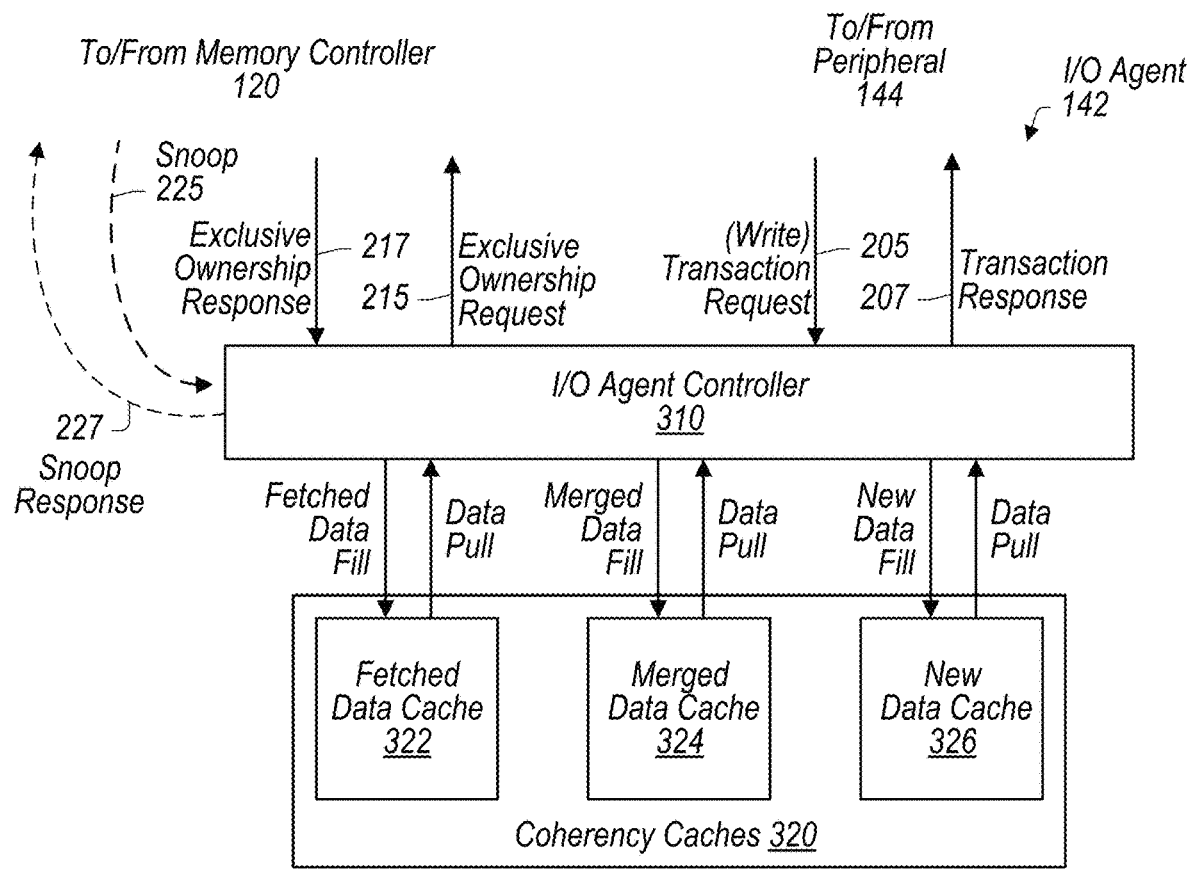
FIG. 3A is a block diagram illustrating example elements of an I/O agent configured to process write transactions, according to some embodiments.

Turning now to FIG. 3A, a block diagram of example elements associated with an I/O agent 142 processing write transactions is shown. In the illustrated embodiment, I/O agent 142 includes an I/O agent controller 310 and coherency caches 320. As shown, coherency caches 320 include a fetched data cache 322, a merged data cache 324, and a new data cache 326. In some embodiments, I/O agent 142 is implemented differently than shown. As an example, I/O agent 142 may not include separate caches for data pulled from memory and data that is to be written as a part of a write transaction.

I/O agent controller 310, in various embodiments, is circuitry configured to receive and process transactions associated with peripherals 144 that are coupled to I/O agent 142. In the illustrated embodiment, I/O agent controller 310 receives a write transaction request 205 from a peripheral 144. The write transaction request 205 specifies a destination memory address and may include the data to be written or a reference to the location of that data. In order process a write transaction, in various embodiments, I/O agent 142 uses caches 320. Coherency caches 320, in various embodiments, are storage arrays that include entries configured to store data or program instructions. Similarly to cache 114, coherency caches 320 may be associative storage arrays (e.g., fully associative or set-associative, such as a 4-way associative cache) or direct-mapped storage arrays, and may have any storage capacity and/or any cache line size (e.g. 32 bytes, 64 bytes, etc.).

Fetched data cache 322, in various embodiments, is used to store data that is obtained in response to issuing an exclusive ownership request 215. In particular, after receiving a write transaction request 205 from a peripheral 144, I/O agent 142 may then issue an exclusive write ownership request 215 to the particular memory controller 120 that manages the data stored at the destination/targeted memory address. The data that is returned by that memory controller 120 is stored by I/O agent controller 310 in fetched data cache 322, as illustrated. In various embodiments, I/O agent 142 stores that data separate from the data included in the write transaction request 205 in order to allow for snooping of the fetched data prior to ordering resolution. Accordingly, as shown, I/O agent 142 may receive a snoop 225 that causes I/O agent 142 to provide a snoop response 227, releasing the data received from the particular memory controller 120.

New data cache 326, in various embodiments, is used to store the data that is included in a write transaction request 205 until ordering dependency is resolved. Once I/O agent 142 has received the relevant data from the particular memory controller 120 and once the write transaction has become the senior transaction, I/O agent 142 may merge the relevant data from fetched data cache 322 with the corresponding write data from new data cache 326. Merged data cache 324, in various embodiments, is used to store the merged data. In various cases, a write transaction may target a portion, but not all of a cache line. Accordingly, the merged data may include a portion that has been changed by the write transaction and a portion that has not been changed. In some cases, I/O agent 142 may receive a set of write transaction requests 205 that together target multiple or all portions of a cache line. As such, processing the set of write transactions, most of cache line (or the entire cache line) may be changed. As an example, I/O agent 142 may process four write transaction requests 205 that each target a different 32-bit portion of the same 128-bit cache line, thus the entire line content is replaced with the new data. In some cases, a write transaction request 205 is a full cacheline write and thus the data accessed from fetched data cache 322 for the write transaction is entirely replaced by that one write transaction request 205. Once the entire content of a cache line has been replaced or I/O agent 142 has completed all of the relevant write transactions that target that cache line, in various embodiments, I/O agent 142 releases exclusive write ownership of the cache line and may then evict the data from coherency caches 320.

Figure 3B:
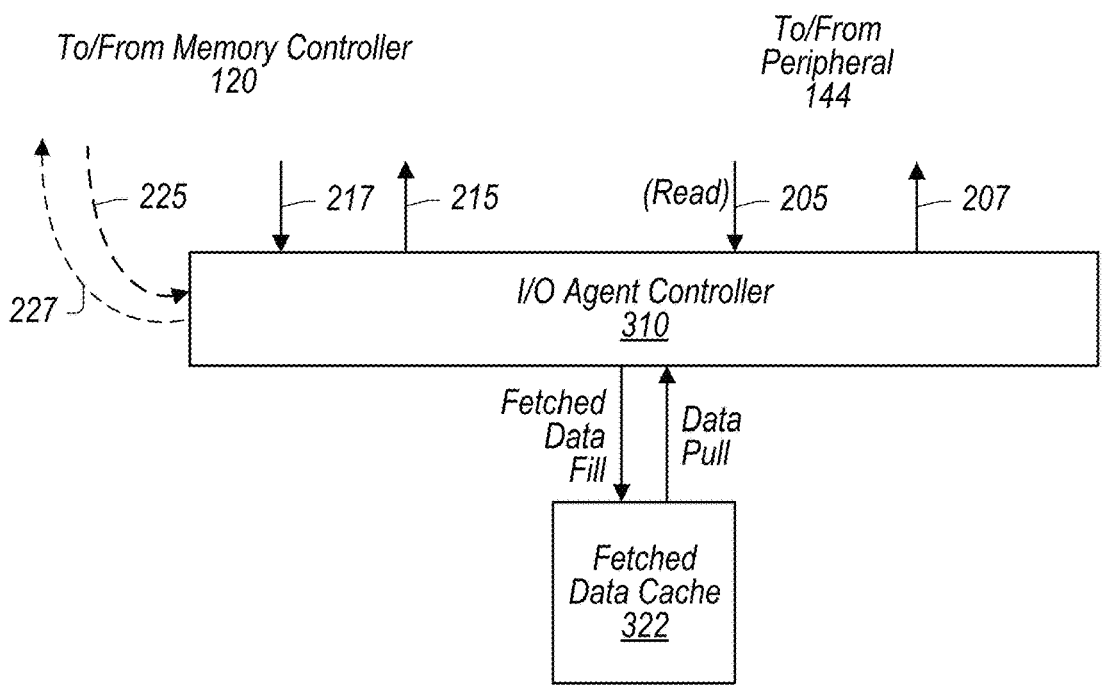
FIG. 3B is a block diagram illustrating example elements of an I/O agent configured to process read transactions, according to some embodiments.

Turning now to FIG. 3B, a block diagram of example elements associated with an I/O agent 142 processing read transactions is shown. In the illustrated embodiment, I/O agent 142 includes I/O agent controller 310 and fetched data cache 322. In some embodiments, I/O agent 142 is implemented differently than shown.

Since I/O agent 142 does not write data for read transactions, in various embodiments, I/O agent 142 does not use merged data cache 324 and new data cache 326 for processing read transactions—as such, they are not shown in the illustrated embodiment. Consequently, after receiving a read transaction request 205, I/O agent 142 may issues an exclusive read ownership request 215 to the appropriate memory controller 120 and receive back an exclusive ownership response 217 that includes the data of the targeted cache line. Once I/O agent 142 has received the relevant data and once the read transaction has become the senior pending transaction, I/O agent 142 may complete the read transaction. Once the entire content of a cache line has been read or I/O agent 142 has completed all of the relevant read transactions that target that cache line (as different read transaction may target different portions of that cache line), in various embodiments, I/O agent 142 releases exclusive read ownership of the cache line and may then evict the data from fetched data cache 322.

Figure 4:
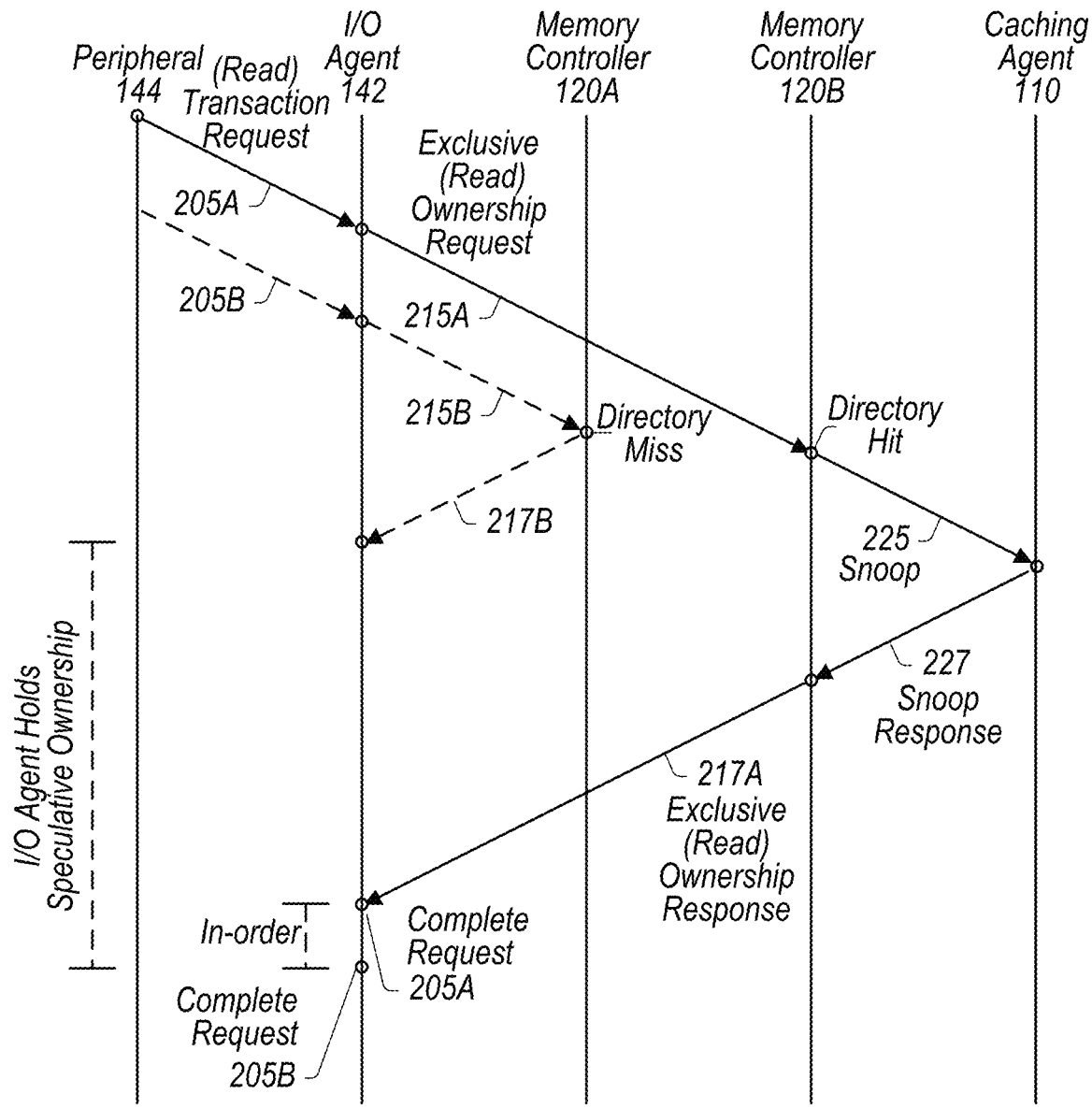
FIG. 4 is a flow diagram illustrating an example of processing read transaction requests from a peripheral component, according to some embodiments.

Turning now to FIG. 4, an example of processing read transaction requests 205 received from a peripheral 144 is shown. While this example pertains to read transaction requests 205, the following discussion can also be applied to processing write transaction requests 205. As shown, I/O agent 142 receives, from peripheral 144, a read transaction request 205A followed by a read transaction request 205B. In response to receiving transaction requests 205A-B, I/O agent 142 issues, for transaction request 205A, an exclusive read ownership request 215A to memory controller 120B and, for transaction request 205B, I/O agent 142 issues an exclusive read ownership request 215B to memory controller 120A. While I/O agent 142 communicates with two different memory controllers 120 in the illustrated embodiment, in some cases, read transaction requests 205A-B may target cache lines managed by the same memory controller 120 and thus I/O agent 142 may communicate with only that memory controller 120 to fulfill read transaction requests 205A-B.

As further depicted, a directory miss occurs at memory controller 120A for the targeted cache line of transaction request 205B, indicating that the data of the targeted cache line is not stored in a valid state outside of memory 130. Memory controller 120A returns an exclusive read ownership response 217B to I/O agent 142 that grants exclusive read ownership of the cache line and may further include the data associated with that cache line. Also as shown, a directory hit occurs at memory controller 120B for the targeted cache line of transaction request 205A. Memory controller 120B may determine, based on its directory 220, that the illustrated caching agent 110 caches the data of the targeted cache line. Consequently, memory controller 120B issues a snoop 225 to that caching agent 110 and receives a snoop response 227, which may include data associated with the targeted cache line. Memory controller 120B returns an exclusive read ownership response 217A to I/O agent 142 that grants exclusive read ownership of the targeted cache line and may further include the data associated with that cache line.

As illustrated, I/O agent 142 receives exclusive read ownership response 217B before receiving exclusive read ownership response 217A. The transactional order rules of peripheral 144, in various embodiments, impose that transaction requests 205A-B must be completed in a certain order (e.g., the order in which they were received). As a result, since read transaction request 205A has not been completed when I/O agent 142 receives exclusive read ownership response 217B, upon receiving response 217B, I/O agent 142 holds speculative read exclusive ownership but does not complete the corresponding read transaction request 205B. Once I/O agent 142 receives exclusive read ownership response 217A, I/O agent 142 may then complete transaction request 205A and issue a complete request 205A to peripheral 144. Thereafter, I/O agent 142 may complete transaction request 205B and also issue a complete request 205B to peripheral 144. Because I/O agent 142 preemptively obtained exclusive read ownership of the cache line associated with read transaction request 205B, I/O agent 142 does not have to send out a request for that cache line after completing read transaction request 205A (assuming that I/O agent 142 has not lost ownership of the cache line). Instead, I/O agent 142 may complete read transaction request 205B relatively soon after completing read transaction request 205A and thus not incur most or all of the delay (e.g., 500 clock cycles) associated with fetching that cache line into I/O agent 142's coherency caches 320.

Figure 5:
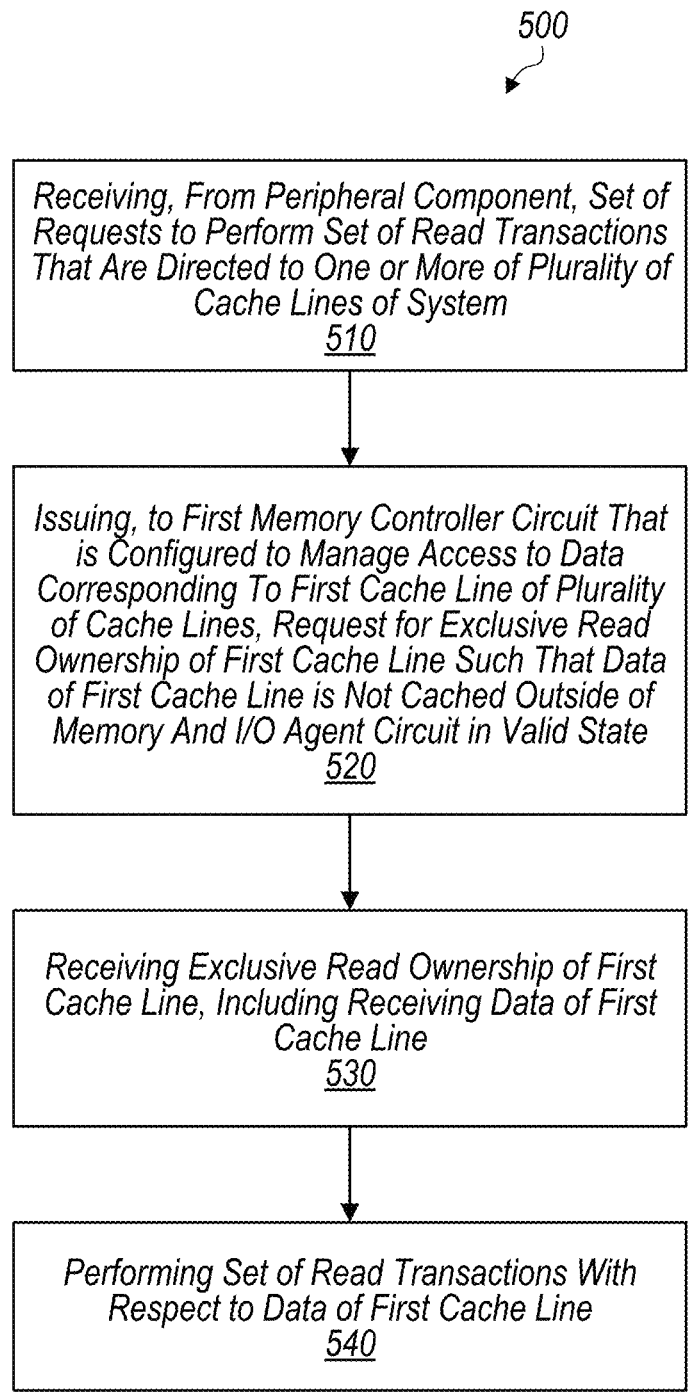
FIG. 5 is a flow diagram illustrating example method relating to the processing of read transaction requests by an I/O agent, according to some embodiments.

Turning now to FIG. 5, a flow diagram of a method 500 is shown. Method 500 is one embodiment of a method performed by an I/O agent circuit (e.g., an I/O agent 142) in order to process a set of transaction requests (e.g., transaction requests 205) received from a peripheral component (e.g., a peripheral 144). In some embodiments, method 500 includes more or less steps than shown—e.g., the I/O agent circuit may evict data from its cache (e.g., a coherency cache 330) after processing the set of transaction requests.

Method 500 begins in step 510 with the I/O agent circuit receiving a set of transaction requests from the peripheral component to perform a set of read transactions (which includes at least one read transaction) that are directed to one or more of the plurality of cache lines. In some cases, the I/O agent receives requests to perform write transactions or a mixture of read and write transactions. The I/O agent may receive those transaction requests from multiple peripheral components.

In step 520, the I/O agent circuit issues, to a first memory controller circuit (e.g., a memory controller 120) that is configured to manage access to a first one of the plurality of cache lines, a request (e.g., an exclusive ownership request 215) for exclusive read ownership of the first cache line such that data of the first cache line is not cached outside of the memory and the I/O agent circuit in a valid state. The request for exclusive read ownership of the first cache line may cause a snoop request (e.g., a snoop 225) to be sent to another I/O agent circuit (or a caching agent 110) to release exclusive read ownership of the first cache line. The request for exclusive read ownership of the first cache line may be issued only in response to the I/O agent making a determination that the set of requests includes at least one write transaction that is directed to the first cache line.

In step 530, the I/O agent circuit receives exclusive read ownership of the first cache line, including receiving the data of the first cache line. In some instances, the I/O agent circuit may receive a snoop request directed to the first cache line and may then release exclusive read ownership of the first cache line before completing performance of the set of read transactions, including invalidating the data stored at the I/O agent circuit for the first cache line. The I/O agent circuit may thereafter make a determination that at least a threshold number of remaining unprocessed read transactions of the set of read transactions are directed to the first cache line and in response to the determination, send a request to the first memory controller circuit to re-establish exclusive read ownership of the first cache line. But if the I/O agent circuit makes a determination that less than a threshold number of remaining unprocessed read transactions of the set of read transactions are directed to the first cache line, then the I/O agent circuit may process the remaining read transactions without re-establishing exclusive read ownership of the first cache line.

In step 540, the I/O agent circuit performs the set of read transactions with respect to the data. In some cases, the I/O agent circuit may release exclusive read ownership of the first cache line without having performed a write to the first cache line while the exclusive read ownership was held. The I/O agent circuit may make a determination that at least two of the set of read transactions target at least two different portions of the first cache line. In response to the determination, the I/O agent circuit may process multiple of the read transactions before releasing exclusive read ownership of the first cache line.

In some cases, the I/O agent circuit may receive, from another peripheral component, a set of requests to perform a set of write transactions that are directed to one or more of the plurality of cache lines. The I/O agent circuit may issue, to a second memory controller circuit that is configured to manage access to a second one of the plurality of cache lines, a request for exclusive write ownership of the second cache line such that: data of the second cache line is not cached outside of the memory and the I/O agent circuit in a valid state; and the data for the second cache line is provided to the I/O agent circuit only if the data is in a modified state. Accordingly, the I/O agent circuit may receive the data of the second cache line and perform the set of write transactions with respect to the data of the second cache line. In some cases, one of the set of write transactions may involve writing data to a first portion of the second cache line. The I/O agent circuit may merge the data of the second cache line with data of the write transaction such that the first portion (e.g., lower 64 bits) is updated, but a second portion (e.g., upper 64 bits) of the second cache line is unchanged. In those cases in which the set of write transactions involves writing to different portions of the second cache line, the I/O agent circuit may release exclusive write ownership of the second cache line in response to writing to all portions of the second cache line.

Figure 6:
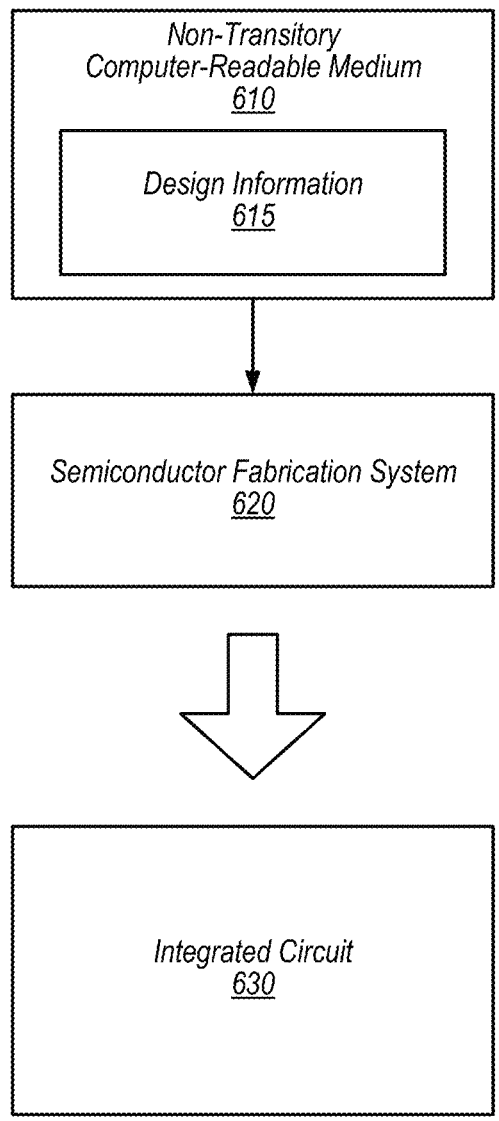
FIG. 6 is a block diagram illustrating an example process of fabricating at least a portion of an SOC, according to some embodiments.

Turning now to FIG. 6, a block diagram illustrating an example process of fabricating an integrated circuit 630 that can include at least a portion of SOC 100 is shown. The illustrated embodiment includes a non-transitory computer-readable medium 610 (which includes design information 615), a semiconductor fabrication system 620, and a resulting fabricated integrated circuit 630. In some embodiments, integrated circuit 630 includes at least a caching agent 110, a memory controller 120, a memory 130, and an I/O cluster 140—in some cases, that memory 130 and one or more peripherals of that I/O cluster 140 may be separate from integrated circuit 630. Integrated circuit 630 may further additionally or alternatively includes other circuits such as a wireless network circuit. In the illustrated embodiment, semiconductor fabrication system 620 is configured to process design information 615 to fabricate integrated circuit 630.

Non-transitory computer-readable medium 610 may include any of various appropriate types of memory devices or storage devices. For example, non-transitory computer-readable medium 610 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 610 may include two or more memory mediums, which may reside in different locations (e.g., in different computer systems that are connected over a network).

Design information 615 may be specified using any of various appropriate computer languages, including hardware description languages such as, without limitation: VHDL, Verilog, SystemC, SystemVerilog, RHDL, M, MyHDL, etc. Design information 615 may be usable by semiconductor fabrication system 620 to fabricate at least a portion of integrated circuit 630. The format of design information 615 may be recognized by at least one semiconductor fabrication system 620. In some embodiments, design information 615 may also include one or more cell libraries, which specify the synthesis and/or layout of integrated circuit 630. In some embodiments, the design information is specified in whole or in part in the form of a netlist that specifies cell library elements and their connectivity. Design information 615, taken alone, may or may not include sufficient information for fabrication of a corresponding integrated circuit (e.g., integrated circuit 630). For example, design information 615 may specify circuit elements to be fabricated but not their physical layout. In this case, design information 615 may be combined with layout information to fabricate the specified integrated circuit.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 is configured to operate according to a circuit design specified by design information 615, which may include performing any of the functionality described herein. For example, integrated circuit 630 may include any of various elements described with reference to FIGS. 1-5. Furthermore, integrated circuit 630 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 630 is performed. Design information 615 may be generated using one or more computer systems and stored in non-transitory computer-readable medium 610. The method may conclude when design information 615 is sent to semiconductor fabrication system 620 or prior to design information 615 being sent to semiconductor fabrication system 620. Accordingly, in some embodiments, the method may not include actions performed by semiconductor fabrication system 620. Design information 615 may be sent to semiconductor fabrication system 620 in a variety of ways. For example, design information 615 may be transmitted (e.g., via a transmission medium such as the Internet) from non-transitory computer-readable medium 610 to semiconductor fabrication system 620 (e.g., directly or indirectly). As another example, non-transitory computer-readable medium 610 may be sent to semiconductor fabrication system 620. In response to the method of initiating fabrication, semiconductor fabrication system 620 may fabricate integrated circuit 630 as discussed above.

Figure 7:
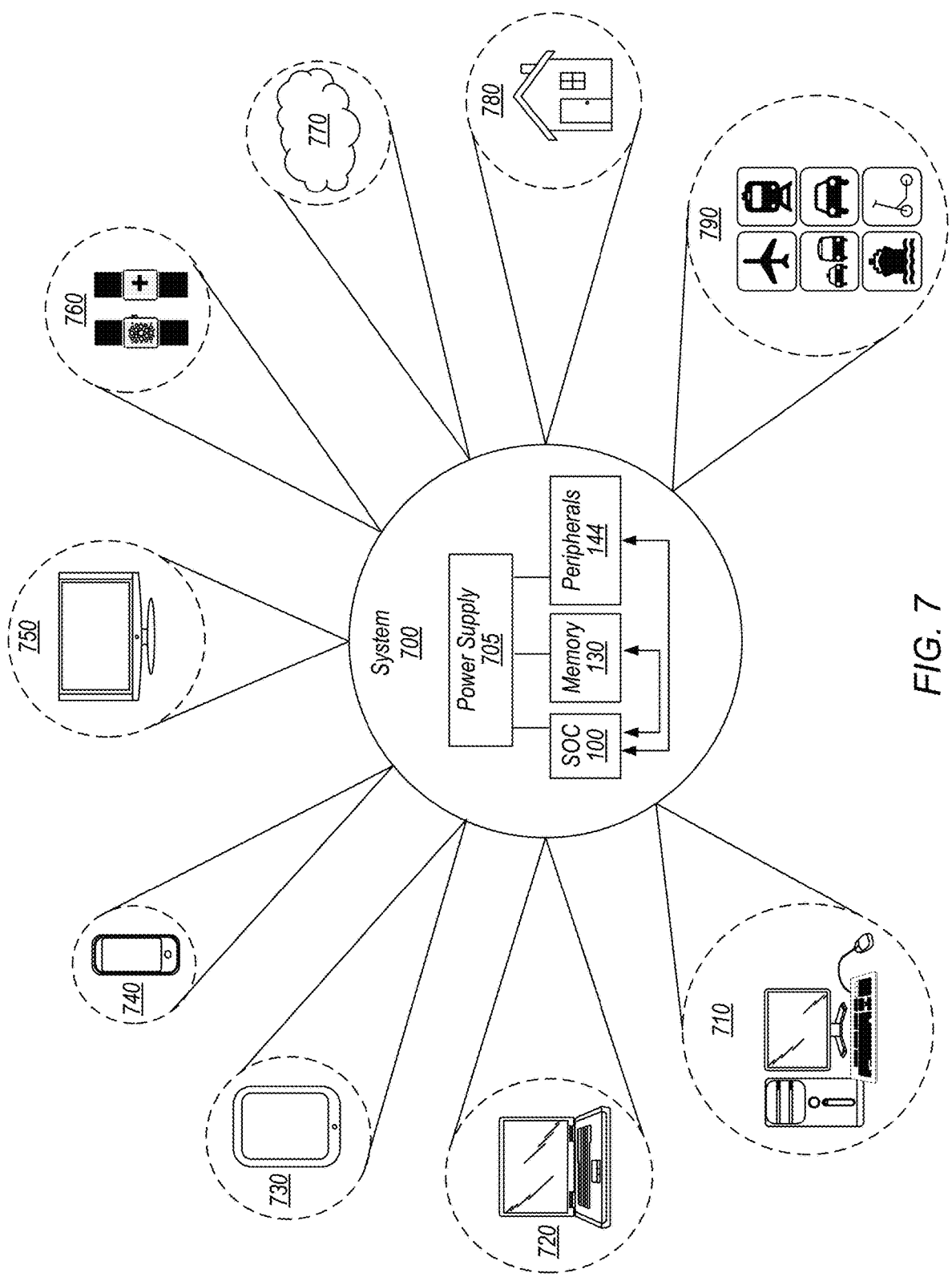
FIG. 7 is a block diagram illustrating an example SOC that is usable in various types of systems, according to some embodiments.

Turning next to FIG. 7, a block diagram of one embodiment of a system 700 is shown that may incorporate and/or otherwise utilize the methods and mechanisms described herein. In the illustrated embodiment, the system 700 includes at least one instance of a system on chip (SOC) 100 that is coupled to external memory 130, peripherals 144, and a power supply 705. Power supply 705 is also provided which supplies the supply voltages to SOC 100 as well as one or more supply voltages to the memory 130 and/or the peripherals 144. In various embodiments, power supply 705 represents a battery (e.g., a rechargeable battery in a smart phone, laptop or tablet computer, or other device). In some embodiments, more than one instance of SOC 100 is included (and more than one external memory 130 is included as well).

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (e.g., remotely located hardware and/or software resources). Still further, system 700 may be utilized in one or more devices of a home 780 other than those previously mentioned. For example, appliances within home 780 may monitor and detect conditions that warrant attention. For example, various devices within home 780 (e.g., a refrigerator, a cooling system, etc.) may monitor the status of the device and provide an alert to the homeowner (or, for example, a repair facility) should a particular event be detected. Alternatively, a thermostat may monitor the temperature in home 780 and may automate adjustments to a heating/cooling system based on a history of responses to various conditions by the homeowner. Also illustrated in FIG. 7 is the application of system 700 to various modes of transportation 790. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 7 are illustrative only and are not intended to be limiting. Other devices are possible and are contemplated.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system, comprising:
    a memory;
    one or more memory controller circuits that are coupled to the memory and configured to manage access to data in the memory;
    one or more peripheral components; and
    an input/output (I/O) agent circuit that is coupled to the one or more memory controller circuits and the one or more peripheral components, wherein the I/O agent circuit is configured to:
        receive, from a peripheral component, a set of requests to perform a set of read transactions that are directed to one or more of a plurality of cache lines of the system;
        issue, to a first memory controller circuit that is configured to manage access to data corresponding to a first cache line of the plurality of cache lines, a request for exclusive read ownership of the first cache line such that the data of the first cache line is not cached outside of the memory and the I/O agent circuit in a valid state;
        receive the data of the first cache line;
        perform the set of read transactions with respect to the data of the first cache line;
        release exclusive read ownership of the first cache line in response to a detection of a snoop request directed to the first cache line; and
        send a request to re-establish exclusive read ownership of the first cache line in response to a determination that the set of read transactions includes at least a threshold number of remaining unprocessed read transactions that are directed to the first cache line.

2. The system of claim 1, wherein the I/O agent circuit is configured to:
    make a determination that less than a threshold number of remaining unprocessed read transactions of the set of read transactions are directed to the first cache line; and
    in response to the determination, process the remaining read transactions without re-establishing exclusive read ownership of the first cache line.

3. The system of claim 1, wherein the I/O agent circuit is configured to:
    make a determination that at least two of the set of read transactions are directed to the first cache line, wherein the at least two read transactions target at least two different portions of the first cache line; and
    in response to the determination, process multiple of the at least two read transactions before releasing exclusive read ownership of the first cache line.

4. The system of claim 1, wherein at least one of the set of read transactions is directed to a second cache line of the plurality of cache lines, and wherein the I/O agent circuit is configured to:
    issue, to a second memory controller circuit that is configured to manage access to data corresponding to the second cache line, a request for exclusive read ownership of the second cache line; and
    receive the data of the second cache line from the second memory controller circuit.

5. The system of claim 1, wherein the I/O agent circuit is configured to:
    receive, from another peripheral component, a set of requests to perform a set of write transactions that are directed to one or more of the plurality of cache lines;
    issue, to a second memory controller circuit that is configured to manage access to data corresponding to a second cache line of the plurality of cache lines, a request for exclusive write ownership of the second cache line such that data for the second cache line is not cached outside of the memory and the I/O agent circuit in a valid state,
    receive the data of the second cache line; and
    perform the set of write transactions with respect to the data of the second cache line.

6. The system of claim 5, wherein a write transaction of the set of write transactions involves writing data to a first portion of the second cache line, wherein the I/O agent circuit is configured to:
    merge the data of the second cache line with data of the write transaction such that the first portion is updated, but a second portion of the second cache line is unchanged.

7. The system of claim 1, wherein the I/O agent circuit is configured to:
    issue, to a second memory controller circuit that is configured to manage access to data corresponding to a second cache line of the plurality of cache lines, a request for exclusive write ownership of the second cache line without receiving the corresponding data for the second cache line if 1) the I/O agent circuit is to perform a full write to the second cache line and 2) the second cache line is not in a modified state.

8. A method, comprising:
    receiving, from a peripheral component by an input/output (I/O) agent circuit of a system, a set of requests to perform a set of read transactions that are directed to one or more of a plurality of cache lines of the system;
    issuing, by the I/O agent circuit to a first memory controller circuit that is configured to manage access to data corresponding to a first cache line of the plurality of cache lines, a request for exclusive read ownership of the first cache line such that the data of the first cache line is not cached outside of a memory of the system and the I/O agent circuit in a valid state;

receiving, by the I/O agent circuit, exclusive read ownership of the first cache line, including receiving the data of the first cache line;

performing, by the I/O agent circuit, the set of read transactions with respect to the data of the first cache line;

releasing, by the I/O agent circuit and in response to receiving a snoop request directed to the first cache line, exclusive read ownership of the first cache line before completing performance of the set of read transactions; and after releasing exclusive read ownership, the I/O agent circuit re-establishing exclusive read ownership of the first cache line based on the set of read transactions having at least a threshold number of remaining unprocessed read transactions that are directed to the first cache line.

9. The method of claim 8, wherein a first read transaction of the set of read transactions is directed to the first cache line and precedes, in non-relaxed transactional order, a second read transaction of the set of read transactions that is directed to a second cache line of the plurality of cache lines, and wherein the method further comprises:

after issuing the request for exclusive read ownership of the first cache line, the I/O agent circuit issuing, to a second memory controller circuit that is configured to manage access to data corresponding to the second cache line, a request for exclusive read ownership of the second cache line; and receiving, by the I/O agent circuit, exclusive read ownership of the second cache line before receiving exclusive read ownership of the first cache line.

10. The method of claim 8, wherein the request for exclusive read ownership of the first cache line causes a snoop request to be sent to another I/O agent circuit to release exclusive read ownership of the first cache line.

11. The method of claim 8, further comprising:

releasing exclusive read ownership of the first cache line without having performed a write to the first cache line while the exclusive read ownership was held.

12. The method of claim 8, further comprising:

receive, from another peripheral component, a set of requests to perform a set of write transactions that are directed to one or more of the plurality of cache lines;

issue, to a second memory controller circuit that is configured to manage access to data corresponding to a second cache line of the plurality of cache lines, a request for exclusive write ownership of the second cache line such that the data of the second cache line is not cached outside of the memory and the I/O agent circuit in a valid state;

receive the data of the second cache line; and perform the set of write transactions with respect to the data of the second cache line.

13. A non-transitory computer readable medium having stored thereon design information that specifies a circuit design in a format recognized by a fabrication system that is configured to use the design information to fabricate a hardware integrated circuit that comprises:

a memory;

one or more memory controller circuits that are coupled to the memory and configured to manage access to data in the memory;

one or more peripheral components; and an input/output (I/O) agent circuit that is coupled to the one or more memory controller circuits and the one or more peripheral components, wherein the I/O agent circuit is configured to:

receive, from a peripheral component, a set of requests to perform a set of read transactions that are directed to one or more of a plurality of cache lines of the hardware integrated circuit;

issue, to a first memory controller circuit that is configured to manage access to data corresponding to a first cache line of the plurality of cache lines, a request for exclusive read ownership of the first cache line such that the data of the first cache line is not cached outside of the memory and the I/O agent circuit in a valid state;

receive the data of the first cache line;

perform the set of read transactions with respect to the data of the first cache line;

release exclusive read ownership of the first cache line in response to receiving a snoop request directed to the first cache line; and after releasing exclusive read ownership, re-establish exclusive read ownership of the first cache line based on the set of read transactions having at least a threshold number of remaining unprocessed read transactions that are directed to the first cache line.

14. The medium of claim 13, wherein at least one of the set of read transactions is directed to a second cache line of the plurality of cache lines that is managed by a second memory controller circuit, and wherein the I/O agent circuit is configured to:

issue, to the second memory controller circuit, a request for exclusive read ownership of the second cache line; and receive the data of the second cache line from the second memory controller circuit and not from the first memory controller circuit.

15. The medium of claim 13, wherein the I/O agent circuit is configured to:

receive, from the peripheral component, a set of requests to perform a set of write transactions that are directed to the first cache line;

issue, to the first memory controller circuit, a request for exclusive write ownership of the first cache line such that the data of the first cache line is not cached outside of the memory and the I/O agent circuit in a valid state; and perform the set of write transactions with respect to the data of the first cache line.

16. The medium of claim 15, wherein the I/O agent circuit is configured to:

release exclusive write ownership of the first cache line in response to receiving a snoop request directed to the first cache line; and after releasing exclusive write ownership, re-establish exclusive write ownership of the first cache line based on the set of write transactions having at least a threshold number of remaining unprocessed write transactions that are directed to the first cache line.

17. The medium of claim 15, wherein a write transaction of the set of write transactions involves writing data to a first portion of the first cache line, wherein the I/O agent circuit is configured to:

merge the data of the first cache line with data of the write transaction such that the first portion is updated, but a second portion of the first cache line is unchanged.

* * * * *